(12) United States Patent
Graja et al.

(10) Patent No.: US 12,449,402 B2
(45) Date of Patent: Oct. 21, 2025

(54) METHOD FOR DESTRUCTION-FREE DETERMINATION OF THE DEPTH OF HARDENING ON SURFACE-HARDENED COMPONENTS

(71) Applicant: Fraunhofer-Gesellschaft zur Förderung der Angewandten Forschung E.V., Munich (DE)

(72) Inventors: Paul Graja, Dresden (DE); Norbert Meyendorf, Dresden (DE); Ralf Schallert, Dresden (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 292 days.

(21) Appl. No.: 18/044,640

(22) PCT Filed: Sep. 8, 2021

(86) PCT No.: PCT/EP2021/074673
§ 371 (c)(1),
(2) Date: Mar. 9, 2023

(87) PCT Pub. No.: WO2022/053493
PCT Pub. Date: Mar. 17, 2022

(65) Prior Publication Data
US 2024/0027402 A1 Jan. 25, 2024

(30) Foreign Application Priority Data
Sep. 10, 2020 (DE) .................. 10 2020 211 379.3

(51) Int. Cl.
*G01N 29/07* (2006.01)
*G01N 29/34* (2006.01)
*G01N 29/48* (2006.01)

(52) U.S. Cl.
CPC ........... *G01N 29/07* (2013.01); *G01N 29/348* (2013.01); *G01N 29/48* (2013.01); *G01N 2291/023* (2013.01); *G01N 2291/028* (2013.01)

(58) Field of Classification Search
CPC ...... G01N 29/07; G01N 29/348; G01N 29/48; G01N 2291/023; G01N 2291/028;
(Continued)

(56) References Cited

U.S. PATENT DOCUMENTS 5,646,351 A * 7/1997 Good .................. G01N 29/26
73/644
9,464,889 B2 * 10/2016 Yanagihara .......... G01B 17/025

FOREIGN PATENT DOCUMENTS

DE 2600720 A1 7/1976
DE 4239159 A1 5/1994
(Continued)

OTHER PUBLICATIONS

German Patent Office, Examination Report in Application No. DE 10 2020 211 379.3, dated May 4, 2021, 5 pages, Munich, Germany.
(Continued)

*Primary Examiner* — Xin Y Zhong
(74) *Attorney, Agent, or Firm* — Marshall & Melhorn, LLC

(57) ABSTRACT

In the method for determining the depth of hardening $d_H$, a predefinable number of at least 5 pulses of transverse ultrasonic waves are coupled into a component at a surface of the component. An individual pulse has at least one oscillation period. Between the individual pulses, the variance in the amplitude heights of ultrasonic waves backscattered or reflected back from the component is detected, during which the propagation time $t_L$ of the ultrasonic waves is determined. The difference between maxima and minima (Continued)

of the determined variances of the ultrasonic waves following the in-coupling is then formed, this value being multiplied by a factor between >0 and 1 and the product being summed with the minimum of the determined variances. The depth of hardening $d_H$ is determined under consideration of the product from the determined propagation time $V_{LZ}$, the cosine of the angle $\theta_r$ at which the ultrasonic waves are coupled into the component surface, and the sound velocity $c_T$ of the ultrasonic waves in the component material.

8 Claims, 1 Drawing Sheet

(58) Field of Classification Search
CPC .... G01N 29/041; G01N 29/28; G01N 29/343; G01N 2291/02827; G01N 2291/044; G01N 29/11; G01N 29/4454; G01N 29/4463

See application file for complete search history.

(56) References Cited

FOREIGN PATENT DOCUMENTS

| DE | 4305064 C1 | 5/1994 |
|----|------------|--------|
| DE | 102008022382 A1 | 11/2009 |
| JP | H01212307 A | 8/1989 |

OTHER PUBLICATIONS

European Patent Office, International Search Report and Written Opinion in Application No. PCT/EP2021/074673, dated Dec. 6, 2021, 10 pages, Rijswijk, Netherlands.

* cited by examiner

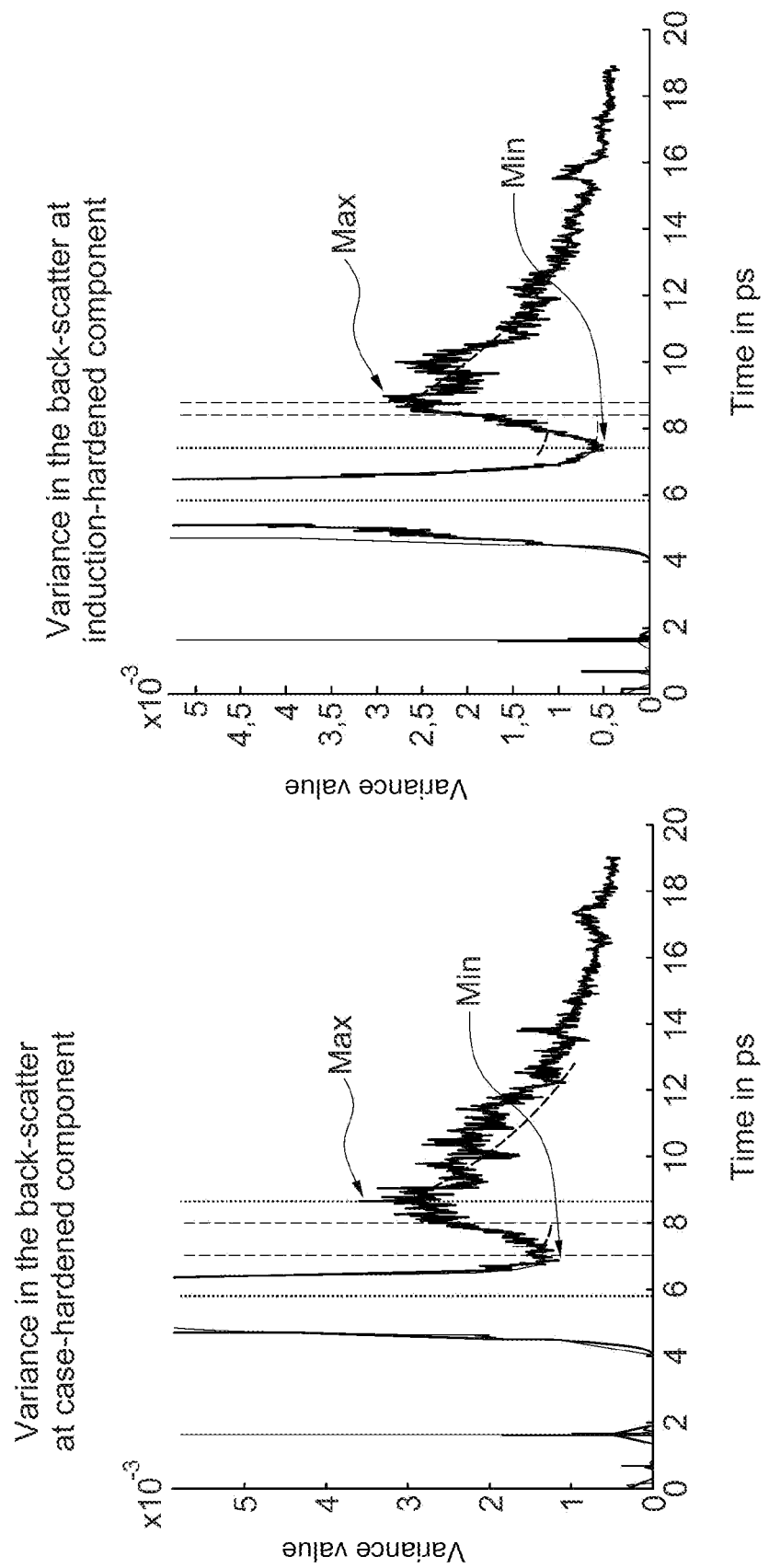

METHOD FOR DESTRUCTION-FREE DETERMINATION OF THE DEPTH OF HARDENING ON SURFACE-HARDENED COMPONENTS

FIELD

The invention relates to a method for destruction-free determination of the depth of hardening $d_H$ on surface-hardened components and in particular on components made of a steel material.

BACKGROUND

The longevity of steel components is of great economic and ecological interest. In order to increase the wear resistance of a steel, the material can be hardened by a heat treatment. Following the hardening, however, the material becomes brittle. Surface hardening, in which only the outer faces up to a certain depth are hardened, also increases the resistance of the component to external influences, but leaves the ductility of the core unchanged. The material characteristics of the component can be adapted for the intended use by surface hardening. Some methods used in the industry for surface hardening will be explained in greater detail hereinafter.

Induction hardening is a form of conversion hardening and is used for hypoeutectoid steels having a sufficiently high carbon content. The component is heated by induced eddy currents and is then cooled rapidly. The resultant structure in a boundary layer at the surface is referred to as martensite. Martensite has a fine needle structure and is characterized in comparison to the unhardened structure by a higher hardness, lower ductility, reduced density and reduced mean grain size (in the region of 5 μm). The depth of hardening is usually determined destructively by hardness measurements of the microhardness on a micrograph of transverse section with increasing distance from the surface. A hardness progression curve is interpolated and the depth at which the hardness falls below the threshold value is determined. In the case of surface hardening according to EN10328:2005, this is 80% of the minimum value of the surface hardness. A certain depth of hardening is sought depending on the intended use of the component. An excessively deep surface hardening leaves the component brittle, but an excessively shallow hardening does not achieve the desired wear resistance. Therefore, the depth of hardening during the surface hardening must be determined at certain test intervals.

Flame hardening and laser hardening differ from induction hardening merely in the heating process. A burning flame or a bundled beam of light is used for the local heat supply. All three hardening processes are classed as surface hardening processes.

SUMMARY

Since the destructive determination of the depth of hardening is costly and cannot be employed for components intended for use, non-destructive testing methods for determining the depth of hardening are of great interest.

Non-destructive testing methods did not previously offer the possibility of directly determining hardness. Therefore, when using non-destructive testing methods, one or more material parameters are examined that correlate with hardness. In addition to non-destructive testing methods, such as the investigation of micromagnetic parameters, including the analysis of Barkhausen noise, incremental permeability and the analysis of the behavior of induced eddy currents or the investigation of heat flow with thermographic methods, the use of ultrasonic back-scatter to determine the depth of hardening has proven its worth. Since the present invention utilizes ultrasonic back-scatter, the previous method of determining depth of hardening will now be explained in greater detail.

To generate and emit ultrasonic waves, piezoelectric transducers are primarily used. These can be made to vibrate by an electrical impulse. The vibration frequency and the time curve (of an ultrasonic pulse) are primarily dependent on the geometry of the transducer, coupled dampers and the electrical excitation pulse. Similarly, piezoelectric elements can be used to convert vibrations into electrical pulses. This provides the basis for the emission and detection of ultrasonic waves. However, the emitter and detector can also use other physical effects.

The propagation of sound is dependent on the medium in which it propagates. In addition, the transition into another medium is dependent on the sound properties of both media. For the highest possible transmission of sound waves into another medium, it is advantageous if the sound properties of the two media are similar. The acoustic impedance is a decisive characteristic value of the sound properties of a material and is the product of density and sound velocity. If the impedance difference between two materials is small, the transmission is high; if the impedance difference is high, a sound wave is reflected more than it is transmitted. Therefore, a coupling means is usually used to introduce ultrasonic waves into a metal component. Oils, water or gels are usually used as coupling means.

Ultrasonic waves can be divided into different wave modes based on the direction of the particle vibration. A particle vibration in the direction of propagation is called longitudinal and a particle vibration orthogonal to the direction of propagation is called transverse. The wave mode is determined by the type of exciting element and the design of a probe.

In the case of transmission at interfaces, an ultrasonic wave is refracted according to Snellius' law. The wave mode and the propagation direction of the introduced sound can thus be determined with the angle of incidence and the sound velocities of the output and input medium. If an exit angle of 90° results, the angle of incidence is called the critical angle. Since the sound velocity of a longitudinal wave is greater than that of a transverse wave, mainly transverse waves are transmitted at angles of incidence above the critical angle of a longitudinal wave. The scanning of ultrasonic waves at a desired angle is usually realized with a plastic leading wedge.

Transverse waves with high sound pressure are desired to determine the depth of hardening. A transverse wave often has an increased scattering behavior and a shorter wavelength compared to a longitudinal wave. The scattering behavior of an ultrasonic wave depends on the relationship between the mean grain size in the structure and the wavelength of the ultrasonic waves. The difference in grain size in the hardened structure compared to the basic structure is used to determine the hardening depth. A transverse wave is scattered less in the hardened region than in the basic structure due to the small mean grain size. The scattering occurs in all directions. The back-scattered ultrasonic waves are received by the probe, which is used as both an emitting and detecting element, or a separate detector. The time difference from transmission to detection of ultrasonic waves back-scattered to the surface provides, together with the analysis of the sound path and the sound velocity, information about the depth at which a coarser-grained structure is present in the particular component and causes the back-scatter. The backscatter shows up in a sudden increase of the signal amplitude. The curve is erratic due to the sharp hardness gradient and the impedance jump, which is present due to the different acoustic properties of the various structures. The larger grains are assessed as unhardened structure and their position within the particular surface-hardened component can be used to determine the depth of hardening.

Due to this assumption, however, a sharp transition from the hardened to the basic structure is necessary in this determination of the depth of hardening. With case-hardened components, the hardened surface is not sharply delineated from the basic structure due to the uniform carbon diffusion. Slow cooling can also lead to a soft transition to the basic structure in the case of induction-hardened components. In these cases, the evaluation of the amplitude heights of the back-scattered ultrasonic waves is not sufficient for a sufficiently accurate determination of the depth of hardening. The soft transition to the basic structure, which is increasingly sought in the industry, makes a new method of destruction-free determination of the depth of hardening necessary.

When contact ultrasound is applied at an angle between 0° and 90° to the particular component surface, an echo signal can be detected by reflections on the surface of the component. The surface structure, the length of the excitation pulse, the geometry and dimension of the ultrasonic-wave-emitting element and the angle of incidence $\theta_i$ of the ultrasonic waves into the surface of the particular component are the decisive parameters that determine the amplitude and the time until the detection of the entrance echo. The entrance echo is superimposed on near-surface back-scatter and thus prevents an evaluation of the back-scatter for depth of hardening determination. This makes it impossible to determine the depth of hardening below a certain threshold value, mainly depending on the length of the entrance echo.

The current technology of destruction-free determination of the depth of hardening by means of ultrasonic back-scatter makes it possible to determine the depth of hardening in contact technology with a measurement accuracy better than ±0.2 mm. This requires approximately a hardness gradient of at least 35 HV/0.1 mm and an approximate mean grain size of the basic structure in the component of more than 30 µm.

In addition, it is not possible to determine the depth of hardening below a threshold value of, for example, 1 mm. These boundary conditions for the destruction-free determination of the depth of hardening are often not fulfilled.

It is therefore the object of the invention to provide possibilities for determining a depth of hardening, which can be less than 2 mm, and/or with a hardened surface, without a sharp transition to the basic structure.

According to the invention, this object is achieved with a method having the features of claim 1. Advantageous embodiments and developments of the invention can be realized with features described in dependent claims.

For the non-destructive determination of the depth of hardening $d_H$, the grain size change in a component can be estimated by ultrasonic back-scatter or reflection. When recording several pulses (a pulse is the excitation of a vibration-emitting element and subsequent detection of ultrasonic waves on the surface of a component) over a certain surface area of a component, a surprising effect occurs after applying suitable mathematical algorithms to the echo heights. This is a change in the ultrasonic back-scatter or reflection over the transit time of back-scattered or reflected ultrasonic waves, which does not show up in the evaluation of the amplitudes of the detected measurement signals. This effect makes it possible to detect changes in the mean grain size and thus to determine the depth of hardening $d_H$ even with small hardness gradients. For the first time, the depth of hardening $d_H$ of case-hardened components and hardened components with a small hardness gradient can be determined destruction-free via ultrasonic back-scatter or reflection.

In the method according to the invention, a predefinable number of at least 5, preferably at least 100 pulses of transverse ultrasonic waves are coupled into a component at a surface of the particular component. This can be achieved with at least one ultrasonic-wave-emitting element, which is also suitable for detecting back-scattered or reflected ultrasonic waves, or an additional ultrasonic-wave-detecting element, which is arranged in a defined position relative to the emitting element. Emission and detection occur intermittently.

A single pulse has at least one vibration period.

The determination of the depth of hardening $d_H$ by ultrasonic waves backscattered or reflected back from the component to the surface is carried out from the calculated variance $V_{LZ}$ of the amplitude height over the transit time of the individual pulses. The transit time $t_L$ of the back-scattered or reflected ultrasonic waves is determined starting from the particular time of emission and/or coupling of the ultrasonic waves into the component until the detection of these back-scattered or reflected ultrasonic waves, recognizable in the increasing variance value. These back-scattered or reflected ultrasonic waves are detected by a difference formation of maxima and minima of the variances following the in-coupling. The difference is multiplied by a material-dependent factor K, which is between >0 and 1 and is dependent on the particular hardening process. The specific minimum after the entrance echo of the variances is added to this product. This sum is used as a threshold value for determining the transit time $t_L$. The transit time $t_L$ results from the difference between the transit time at which the calculated threshold value is exceeded for the first time after the minimum and the transit time of the entrance echo.

With a K factor of 1, the basic structure or microstructures of the component material similar to the basic structure are present. For sharp hardness gradients, a K factor of greater than 0.5 and less than 0.7 is advantageous. A smaller K factor should be used for soft hardness gradients. For induction-hardened components it should be between 0.1 and 0.4 for those with a soft hardness profile and less than 0.3 for those that are case-hardened. These differences are dependent on the one hand on the progression of the mean grain size over the depth, and on the other hand on the definition of the hardness value for determining the depth of hardening, which is usually higher for case-hardened components than for surface-hardened ones.

The particular depth of hardening $d_H$ is then determined under consideration of the product from the determined transit time $t_L$, the cosine of the resultant angle $\theta_r$, at which the ultrasonic waves propagate in the component, and the component-specific sound velocity $c_T$. In the absence of a characteristic reflection, such as the entrance echo, the transit time $t_L$ can be determined under consideration of the known path traveled by the ultrasonic waves through a solid wedge-shaped element or a liquid medium via which the ultrasonic waves are coupled into the component. A liquid medium can be a liquid or a gel.

During the emission and detection of the ultrasonic waves, the position at which ultrasonic waves are coupled into the surface and detected can be changed during execution of the method within a surface region which has an area of at most 3000 mm². In this way, further averaging can be achieved and, if necessary, minor differences in the determined local depth of hardening $d_H$ can be compensated.

Ultrasonic waves with an angle $\theta_i$ in the range 15° to 50° should be coupled into the component surface.

Ultrasonic waves can be coupled in, in each case, at a constant frequency in a frequency range of 5 MHz to 100 MHz.

Detection should be performed at a single pulse length in the range of 5 ns to 100 ns, advantageously at 25 ns and/or at a detection rate in the range 50 MHz to 1000 MHz, preferably at 100 MHz.

One probe can be used with the pulse-echo method or several probes can be used in various arrangements: pitch catch, transmission or impulse echo, since the back-scatter occurs in principle in all directions.

In addition, the integer multiples of the fundamental frequency, the harmonic frequencies, can also be evaluated. For this purpose, a probe that can emit ultrasonic waves over an extremely wide bandwidth or, better, several probes with different resonance frequencies can be used. Here, the frequency is too low with regard to the back-scatter/reflection in the basic structure. Due to the wave characteristics of ultrasound, harmonic waves can form which oscillate with increased frequency, always an integer multiple of the fundamental frequency. These sound waves with harmonic frequencies scatter more strongly in the basic and transition structure and can be detected with probes adapted in respect of frequency. Subsequently, the depth of hardness can be determined according to the described method.

DESCRIPTION OF THE FIGURES

In the following, the invention will be explained in greater detail by way of example.

In the drawing:

FIG. 1 shows two graphs of the variances of the amplitude heights and the transit time $t_L$ determined for two different steels with the maxima and minima taken into consideration in the evaluation.

DETAILED DESCRIPTION

To determine the depth of hardening $d_H$, one example uses an unfocused longitudinal ultrasonic probe that couples ultrasonic waves at a frequency of 20 MHz into a Rexolite 1422 wedge at an angle of inclination of 28° with respect to the lower sound exit face of the wedge. A thin film of oil is applied as a coupling medium between the ultrasonic-wave-emitting surface of the probe and the wedge. Between the wedge and the test component, a water-based gel is coupled to the particular surface of the test component as a further coupling medium. The probe is excited with short and strong single pulses. The particular pulse length is 50 ns for a broadband ultrasonic signal and the electrical voltage applied to the piezo elements of the probe is 350 V for a high sound pressure. Due to the different sound velocities in the wedge material made of Rexolite and in the test body made of steel and due to coupling into the component at an angle $\theta_i$ larger than the first critical angle, mainly transverse waves below 40° are induced in the test component. These transverse waves are back-scattered depending on the grain size. 160 pulses are executed, recorded and saved, one after the other. The number of 160 pulses is a compromise here between test speed and a sufficiently large data set. The recording length here is 20 us and the detection rate is 100 MHz. While emitting the pulses, the test head with wedge-shaped element is manually moved back and forth by approximately 10 mm. Lateral or circular movements are also possible. The variance of the amplitude heights over the transit time of the 160 pulses is calculated from the recorded ultrasonic signals. The resulting curve is evaluated.

An entrance echo of back-scattered or reflected ultrasonic waves is detected at the surface of the test component with the coupling layer between wedge-shaped element and test component surface. Due to the movement of the probe over the surface, the entrance echo is also visible in the display of the variances with a large deflection. For depths of hardening $d_H$ greater than 1.5 mm, a local minimum follows the entry echo in the representation of the determined variances $V_{LZ}$ over the transit time. The variance value of the minimum is dependent on the mean grain size of the surface layer and the depth of hardening $d_H$. Variance values caused by the electronic noise of the test hardware are not undershot by the variance of reflected and detected ultrasonic wave amplitudes. The minimum is followed by the local maximum of the back-scatter with a characteristic increase between these two values. This increase can be attributed to the transition from the hardened surface layer to the core of the component. Since the depth of hardening $d_H$ is always present in this transition, the flank is analyzed in greater detail. The difference between the local minimum and local maximum of the variance values $V_{LZ}$ is determined. The difference is multiplied by a factor K between 0 and 1. This factor K is dependent on the hardening method and the particular steel grade. The product is summed with the local minimum. The transit time at which the edge exceeds this value for the first time is then determined. This transit time is subtracted with the transit time of the maximum of the variance of the entrance echo. This difference, the transit time $t_L$, is calculated with the sound velocity of the transverse wave in the test body and with the angle $\theta_r$ with which the ultrasonic waves propagate in the component to determine the depth of hardening $d_H$. An entry echo is constituted by reflected ultrasonic waves from the component surface.

In the graph shown in FIG. 1 on the left, 160 pulses were evaluated for a test component made of 16MnCr5 that was case-hardened, and in the graph shown on the right, 160 pulses were also evaluated for a test component made of C45 that was induction-hardened.

The pitch-catch test setup in a "V" arrangement can be used to determine small depths of hardening $d_H$, which are superimposed by the entrance echo in the pulse-echo arrangement. For this purpose, a special wedge geometry is advantageous, in which a part of the individual ultrasonic waves is "cut off". Thus, the highest possible sound pressure can be realized in front of the wedge-shaped element. For the first time, the depth of hardening $d_H$ of casehardened components and hardened components with a small hardness gradient can be determined destruction-free via ultrasonic back-scatter. Alternatively, a transceiver probe with specific roof angle can be used.

What is claimed is:

1. A method for destruction-free determination of a depth of hardening $d_H$ at surface-hardened component parts, in which a predefinable number of at least 5 pulses of transverse ultrasonic waves are coupled into a component at a surface of the component in question, wherein an individual pulse has at least one oscillation period, and, between the individual pulses, a variance in an amplitude heights of ultrasonic waves back-scattered or reflected back from the component at the surface is detected, during which a transit time $t_L$ of the back-scattered or reflected ultrasonic waves is determined starting from a particular moment in time of an emission and/or in-coupling of the ultrasonic waves into the component surface until the detection of these back-scattered or reflected ultrasonic waves of the individual pulses, for which a difference between maxima and minima of the determined variances of the back-scattered or reflected ultrasonic waves following the in-coupling is then formed, wherein this difference is multiplied by a factor between more than 0 and up to 1, said factor being material-dependent and dependent on the particular hardening process, and a resulting product of this multiplication being summed with a minimum of the determined variances, wherein the resulting sum is used as a threshold value for determining the transit time $t_L$, wherein the particular depth of hardening du is determined under consideration of a product from the determined transit time $t_L$, a cosine of a resultant angle $\theta_r$ at which the ultrasonic waves propagate in the component, and a sound velocity $c_T$ of the ultrasonic waves in the component material.

2. The method according to claim 1, wherein the pre-definable number of pulses of transverse ultrasonic waves coupled into a component at the surface of the component is at least 100.

3. The method according to claim 1, wherein the position at which ultrasonic waves are coupled into the surface and detected is changed during execution of the method within a surface region which has an area of at most 3000 mm².

4. The method according to claim 1, wherein ultrasonic waves are coupled into the component surface at an angle $\theta_i$ in the range of 15° to 50°.

5. The method according to claim 1, wherein ultrasonic waves are coupled in with in each case a constant frequency in a frequency range of 5 MHz to 50 MHz.

6. The method according to claim 1, wherein the detection is performed at an individual pulse length in the range of 5 ns to 100 ns and/or at a detection rate in the range of 50 MHz to 1000 MHz.

7. The method according to claim 1, wherein an integer multiple of a fundamental frequency and/or a harmonic frequency are taken into consideration when determining the variance.

8. The method according to claim 1, wherein transverse ultrasonic waves with a solid wedge-shaped element or a liquid medium are coupled in at the surface of the particular component.

* * * * *